UNITED STATES PATENT OFFICE.

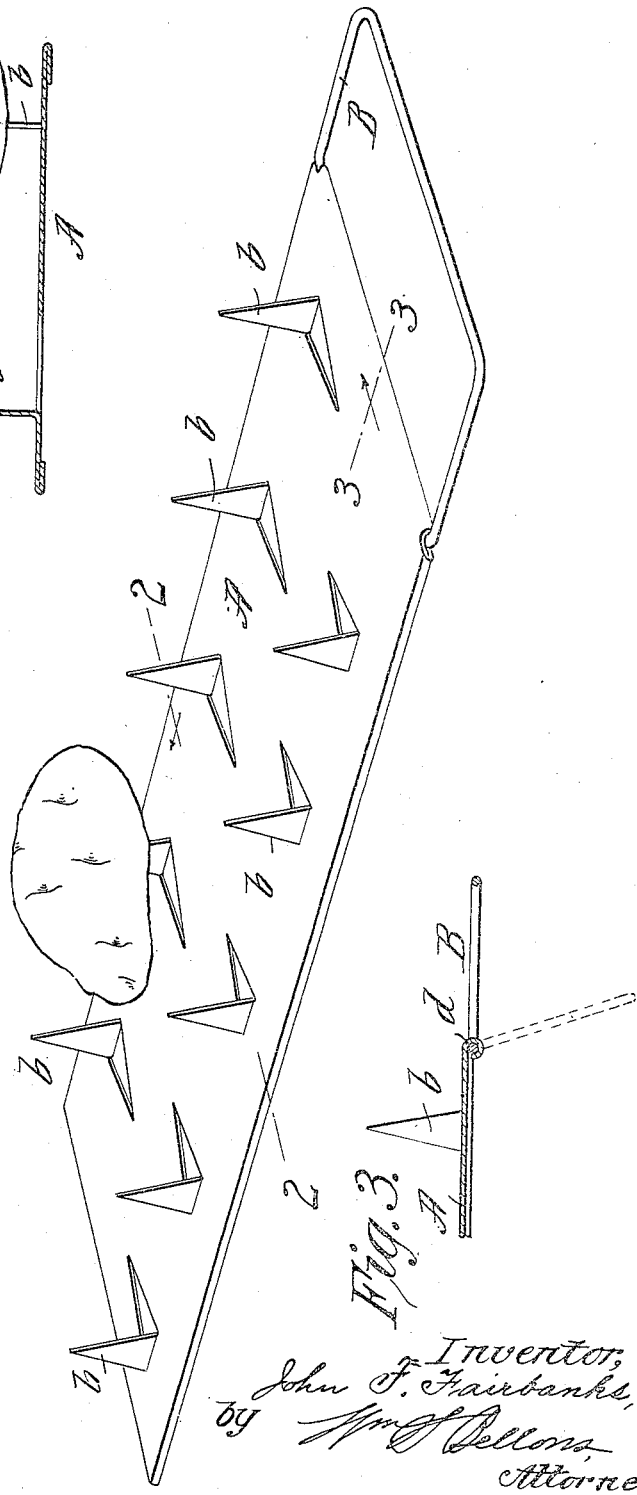

JOHN F. FAIRBANKS, OF SPRINGFIELD, MASSACHUSETTS.

POTATO-BAKING UTENSIL.

No. 931,587.     Specification of Letters Patent.     Patented Aug. 17, 1909.

Application filed October 28, 1907. Serial No. 399,520.

*To all whom it may concern:*

Be it known that I, JOHN F. FAIRBANKS, a citizen of the United States of America, and resident of Springfield, in the county of Hampden and State of Massachusetts, have invented certain new and useful Improvements in Potato-Baking Utensils, of which the following is a full, clear, and exact description.

This invention relates to improvements in a device for baking potatoes, especially, although adaptable for the baking of other vegetables; and the device of the character to which the invention pertains constitutes a holder on which all of the baked potatoes, etc., may be conveniently withdrawn from the oven; and the upstanding members of the device by which the potatoes are pierced and supported insure a venting of the vegetables which prevents their bursting under the action of heat in baking.

The device embodying details of construction comprised in this invention is illustrated in the accompanying drawings, is hereinafter described in conjunction with such drawings, and is set forth in the claim.

In the drawings:—Figure 1 is a perspective view; Fig. 2 is a cross sectional view on line 2—2, Fig. 1; and Fig. 3 is a partial sectional view as taken longitudinally on line 3—3, Fig. 1.

Similar characters of reference indicate corresponding parts in all of the views.

In the drawings,—A represents an elongated sheet metal plate constructed with opposite rows of inwardly converged V-shaped incisions with the metal therewithin turned at right angles to the base plate to constitute opposite longitudinally ranging sets of upstanding pointed tongues $b, b$, on the individual ones of which potatoes may be "spiked." and supported for a most effectual and satisfactory baking of the same in an oven.

As represented in Fig. 1, the upstanding V-shaped tongues ranged adjacent the one longitudinal edge of the plate are offset or staggered from those arranged along the opposite edge of the plate for acquiring a maximum potato holding capacity.

One end portion of the plate is bent around to constitute a full or partial tube $d$ engaged in which are the inwardly bent end portions of a handle constituting bail B, provided for convenience in withdrawing the potato baker from an oven and for the suspension of the utensil.

I claim:—

A device for the purpose described consisting of an elongated sheet metal plate having opposite rows of inwardly converged V-shaped incisions with the metal therewithin upwardly turned to constitute opposite series of upstanding pointed tongues, one end portion of the plate being turned to constitute a tubular bail-retaining tube, and a handle-constituting bail engaged in the tubular formed end of the plate.

Signed by me at Springfield, Mass., in presence of two subscribing witnesses.

JOHN F. FAIRBANKS.

Witnesses:
   WM. S. BELLOWS,
   G. R. DRISCOLL.